United States Patent [19]

Naito et al.

[11] Patent Number: 4,996,677
[45] Date of Patent: Feb. 26, 1991

[54] MULTICHANNEL MAGNETIC AND OPTICAL LINEAR HEAD

[75] Inventors: Seishi Naito; Masaaki Hayashi, both of Himeji, Japan

[73] Assignee: Glory Kogyo Kabushiki Kaisha, Hyogo, Japan

[21] Appl. No.: 167,841

[22] Filed: Mar. 14, 1988

[30] Foreign Application Priority Data

Mar. 13, 1987 [JP] Japan .................. 62-36820[U]

[51] Int. Cl.⁵ .................. G11B 5/29; G11B 5/127
[52] U.S. Cl. .................. 369/14; 360/114; 360/121
[58] Field of Search .................. 369/14, 13; 360/121, 360/129, 114, 125; 235/449

[56] References Cited

U.S. PATENT DOCUMENTS

| | | | |
|---|---|---|---|
| 3,959,824 | 5/1976 | Ohi et al. | 360/121 |
| 4,056,712 | 11/1977 | Trenkamp et al. | 235/449 |
| 4,072,994 | 2/1978 | Takashima | 360/124 |
| 4,420,782 | 12/1983 | Argumendo et al. | 360/129 |
| 4,787,002 | 11/1988 | Isozaki | 360/123 |

FOREIGN PATENT DOCUMENTS

| | | | |
|---|---|---|---|
| 56-03831 | 7/1981 | Japan | 360/121 |
| 0705511 | 12/1979 | U.S.S.R. | 360/129 |

Primary Examiner—Stuart S. Levy
Assistant Examiner—Hoa Nguyen
Attorney, Agent, or Firm—Wenderoth, Lind & Ponack

[57] ABSTRACT

Sensor are widely used to read magnetic data and to read the magnetic and the optical patterns printed on notes and so on. A multichannel head in accordance with the present invention has plural magnetic cores arranged in a row and a cancellation core for noise removal, the head can detect magnetic characteristics as a whole in a stationary state without depending on the relative speed of the magnetic member with the head, and therefore is least affected by noise. Since one cancellation core is shared by plural magnetic cores, the structure as a whole becomes simple, and the cost of manufacture can be remarkably reduced. Since a magnetic head is combined with optical fibers in an integral structure according to this invention, it can read magnetic patterns and the optical patterns on the same location simultaneously by a parallel operation.

13 Claims, 9 Drawing Sheets

MULTICHANNEL MAGNETIC AND OPTICAL LINEAR HEAD

BACKGROUND OF THE INVENTION

This invention relates to a multichannel magnetic head of an AC excitation type, and more particularly to a multichannel magnetic and optical head of a structure comprising optical fibers arranged in a row on the multichannel magnetic head which can simultaneously linearly read magnetic patterns and optical patterns of the same location of an object of detection.

Magnetic heads are widely used for reading data recorded on magnetic cards or a tape, or data printed in readable magnetic ink on a note. The prior art magnetic heads are classified into two types, i.e. an AC excitation type and a DC excitation type, and have the following features.

Figures 1, 2, 3:
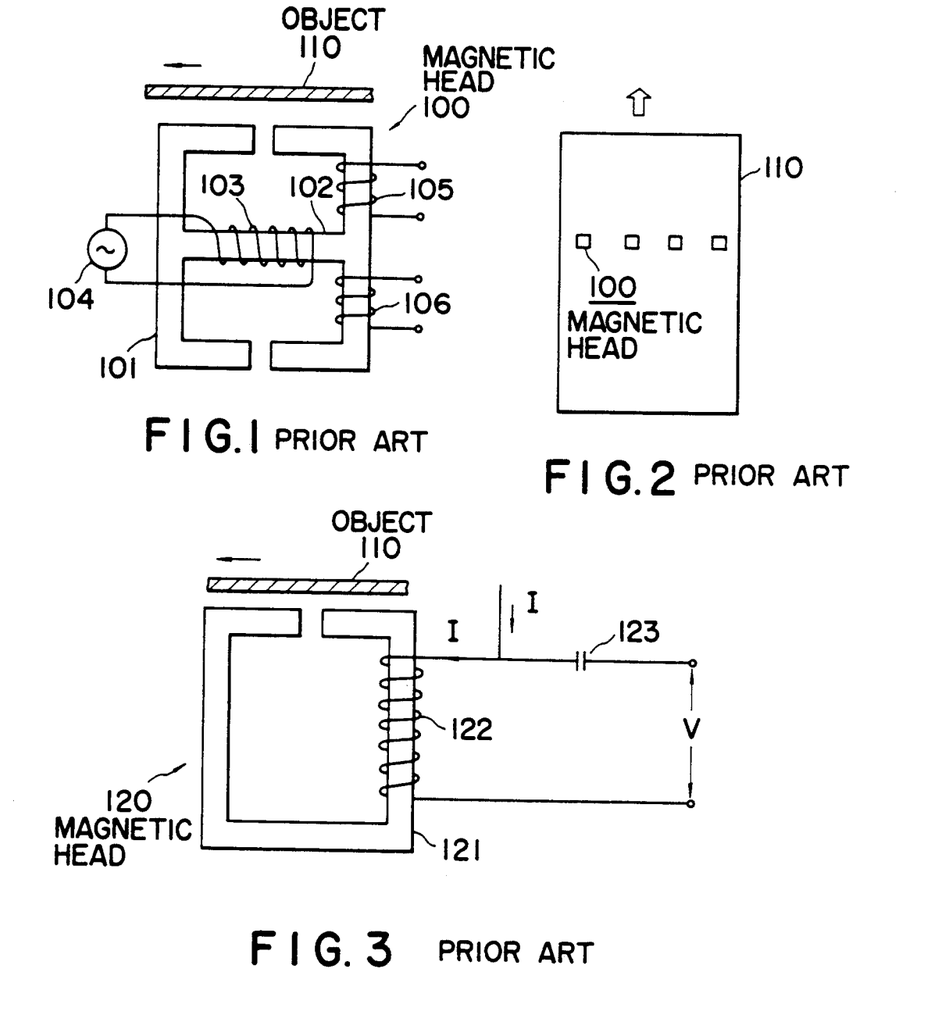
FIG. 1 is a view used to show the structure of a prior art AC excitation type magnetic head.
FIG. 2 is a view used to shown an application thereof.
FIG. 3 is a view used to show the structure of a prior art DC excitation type magnetic head.

FIG. 1 shows an AC excitation type magnetic head 100 comprising a magnetic ore 101 of the shape of twin E letters of which central bridge arm 102 is wound with a primary coil 103. The primary coil 103 is connected to an AC power source 104. The magnetic core 101 is wound with the secondary coil 105 on the upper side thereof and with a cancellation coil 106 on the lower side thereof. An object 110 of detection such as a not is adapted to pass above the magnetic core 101.

In the structure above explained, the primary coil 103 is excited with the AC power source 104, and when the object 110 of detection including a magnetic member passes above the upper surface of the magnetic core 101, signals corresponding to the magnetic intensity or the pattern of the magnetic member are outputted from the secondary coil 105. The difference between the above output and the output from the cancellation coil 106 is extracted as magnetic signals in order to remove noise components and bias components arising out of fluctuations in the AC power source 104 and in temperature characteristics of the magnetic core 101.

Since the prior art AC excitation type magnetic head has a magnetic core 101 which is wound with both the secondary coil 105 and the cancellation coil 106, the size of the structure becomes inconveniently big, and when the object 110 as a whole is to be detected simultaneously, a plurality of magnetic heads 100 must be arranged at intervals as shown in FIG. 2. The detection range therefore becomes discrete and incapable of detecting objects at a high precision. This presents a problem in the detection of notes and other objects where highly precise detection is a prerequisite.

FIG. 3 shows a DC excitation magnetic head 120 comprising a magnetic core 121 of the shape of an inverted letter U and an arm of which is wound with an exciting coil 122. The exciting coil 122 is supplied with a DC constant current I. When the object 110 of detection passes above the detection head plane, differential signals are obtained as detection signals V in correspondence to the chronological change on the magnetic member equivalent to the DC component cut off by a capacitor 123.

The DC excitation magnetic head 120 has problems in that as the detection signal V is obtained as a chronological change on the magnetic member, it cannot detect objects which are stationary and moreover has problems in that the level of detection signals changes depending on the relative speed of the object. Since the DC excitation magnetic head 120 is of a small size, some systems have plural heads arranged in a row to cover a wide range. Due to the above mentioned fatal defect, the head cannot be applied to the detection of the magnetic intensity or the magnetic pattern on notes.

Figure 4:
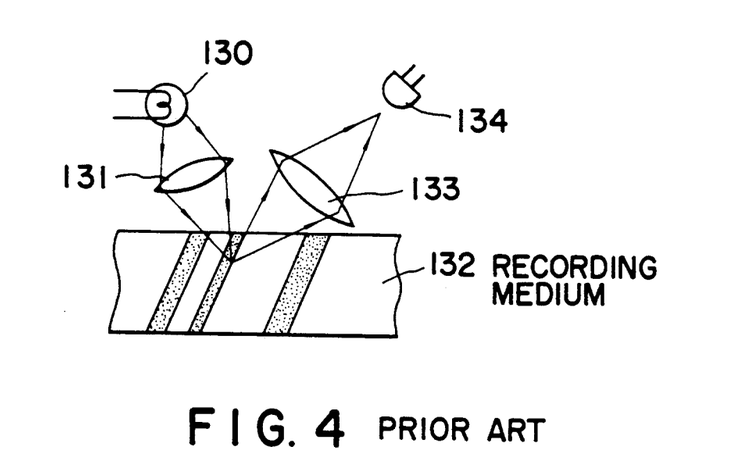
FIGS. 4 and 5 are views used to show examples of detection with prior art optical sensors, respectively.
Figure 5:
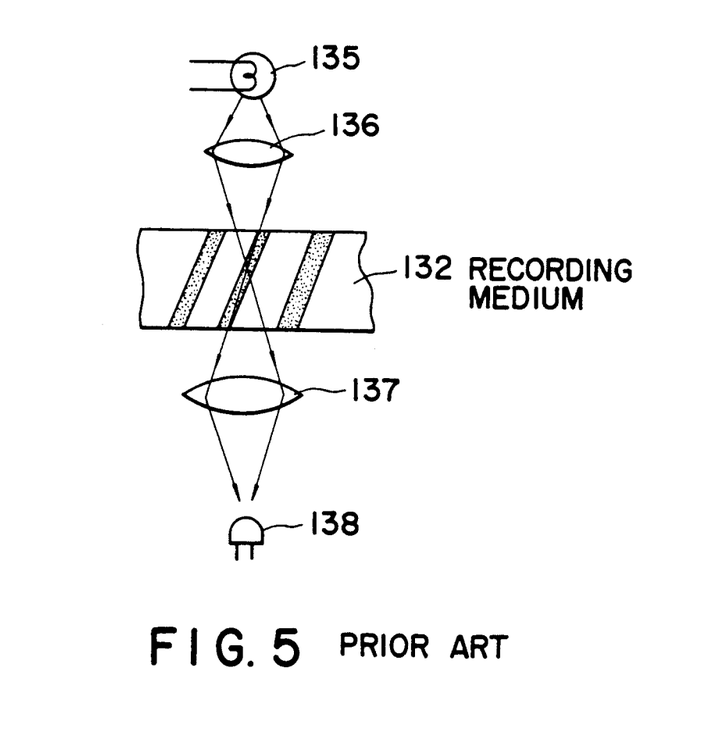

There have been proposed in the prior art other optical sensors such as those shown in FIGS. 4 and 5, respectively. In the optical sensor shown in FIG. 4, the light from a light emitting element 130 is focused by a lens 131 for projection on a recording medium 132, and the light reflected from the recording medium 132 is focused on a light receiving element 134 for detection. In the sensor shown in FIG. 5, the light from a light emitting element 135 is focused by a lens 136 for projection on the recording medium 132 and for passing through the recording medium 132, and the transmitted light is focused by a lens 137 for inputting into a light receiving element 138 to thereby read the pattern defined in optical density variations on the recording medium 132.

As the simultaneous formation of a magnetic pattern and an optical pattern on the recording medium 132 became possible in recent years by mixing magnetic powder with print ink, the aforementioned magnetic sensor and optical sensor can now be incorporated in one system for reading the magnetic pattern and the optical pattern concurrently. However, the system is not integrally structured and is incapable of reading the same spot on data at the same time of the above two types of patterns.

SUMMARY OF THE INVENTION

This invention was contrived to obviate the aforementioned defects encountered in the prior art, and aims at providing a multichannel type magnetic head which can precisely detect the magnetic intensity as well as magnetic pattern in a wide range of an object simultaneously even if the object is in a stationary state without dependence on the relative speed of the object with respect to the magnetic head.

Another object of this invention is to provide a multichannel type magnetic and optical head which can detect magnetic patterns and optical patterns on the same location simultaneously and effectively.

According to one aspect of this invention, for achieving the objects described above, there is provided a multichannel type magnetic head comprising plural magnetic cores arranged in a row which are wound with primary coil and secondary coils respectively, a cancellation core which is wound with the primary coil for cancellation and with the secondary coil for cancellation, and a member which integrally connects said plural magnetic cores and said cancellation core, which is characterized in that detection planes of said magnetic cores are arranged in a row opposed to an object of detection.

According to another aspect of this invention, there is provided a multichannel type head comprising an arrangement of plural magnetic cores which are wound with primary coils and with secondary coils respectively, and which are provided with gaps at an interval on detection planes thereof, a cancellation core which is wound with the primary coil for cancellation, a member which integrally connects said plural magnetic cores and optical fibers arranged in each gap which is characterized in that the detection planes of said magnetic cores and an end of said optical fibers are opposed as a row to an object of detection.

The nature, principle and utility of the invention will become more apparent from the following detailed description when read in conjunction with the accompanying drawings.

BRIEF DESCRIPTION OF THE DRAWINGS

In the accompanying drawings:

FIG. 13A is a plane view used to show a head unit while

DETAILED DESCRIPTION OF THE INVENTION

Figure 6:
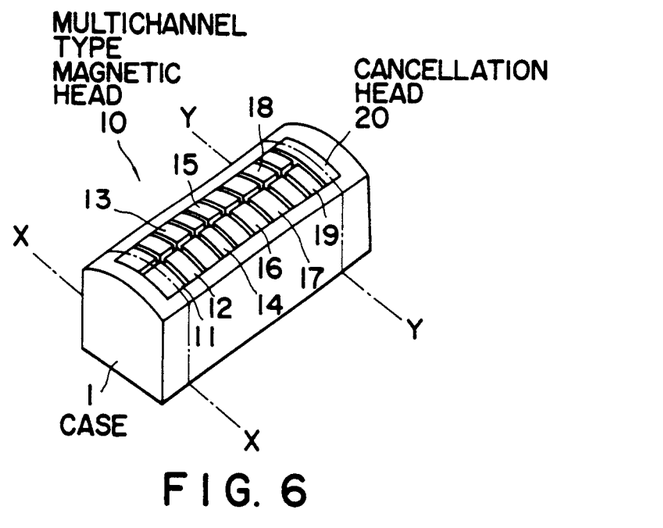
FIG. 6 is a perspective view used to show an embodiment according to this invention.
Figure 7A:
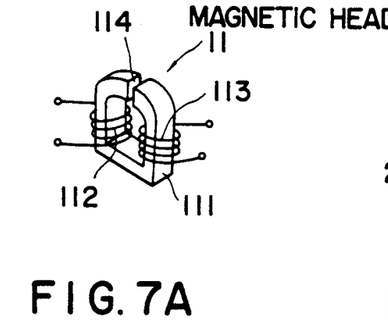
FIGS. 7A and 7B are structural views used to show embodiments of a magnetic head and a cancellation head used for this invention, respectively.
Figure 7B:
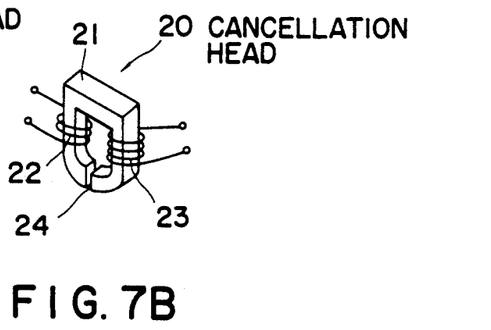
Figures 8A, 8B:
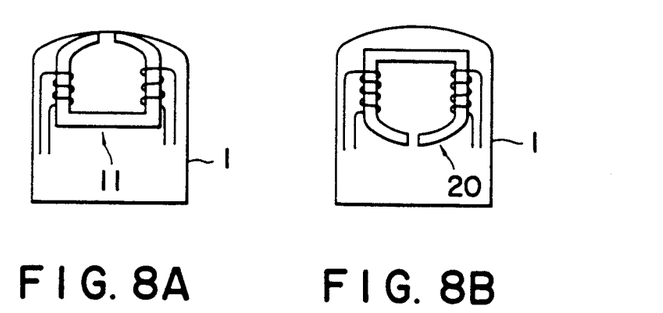
FIG. 8A is a cross-sectional view of the embodiment shown in FIG. 6 at the line X—X.
FIG. 8B is a cross-sectional view at the line Y—Y.

FIG. 6 is a perspective view to show an embodiment of a multichannel type magnetic head 10 according to this invention wherein magnetic heads 11 to 19 as shown in FIG. 7A are arranged in a row on a detection head plane within a case 1 which is shaped like a parallelepiped with a domed upper plane. FIG. 7A shows the structure of a magnetic head 11. A cancellation head 20 is provided at one of the detection head plane of the case 1. FIG. 7B shows the structure of the cancellation head 20. Since the magnetic heads 11 through 19 are of an identical structure, a magnetic head 11 alone will be described for simplicity's sake by referring to FIG. 7A. The magnetic head 11 has a magnetic core 111 which is shaped like letter U, and arms on both sides thereof are wound with the primary coil 112 and with the secondary coil 113, respectively. The magnetic head 11 is placed in the case 1 in a manner that a detection plane 114 thereof becomes the detection head plane of the multichannel type head 10 shown in FIG. 6. The cross section along the line X—X in FIG. 6 is shown in FIG. 8A.

The cancellation head 20 has a structure substantially similar to the magnetic heads 11 through 19 as shown in FIG. 7B wherein a magnetic core 21 shaped like letter U has arms on both sides which are wound with the primary coil 22 for cancellation and with the secondary coil 23 for cancellation respectively and is placed in the case 1 at one end thereof in a manner that a detection plane 24 of the cancellation head 20 faces the direction opposite to the detection head plane of the multichannel type magnetic head 10 of FIG. 6. The cross section of the case along the line Y—Y in FIG. 6 is shown in FIG. 8B. The output from the secondary coil 23 of the cancellation head 20 is preferably smaller than outputs from the magnetic heads 11 through 19. Therefore, the winding members of the primary coil 22 and the secondary coil 23 are adjusted in a manner that the output from the secondary coil 23 of the cancellation head 20 becomes smaller than the output from the secondary coils of the respective magnetic heads when they are driven by the same power source.

As described above, nine magnetic heads 11 through 19 and one cancellation head 20 are arranged in a row and are placed in the case 1 integrally.

Figure 9:
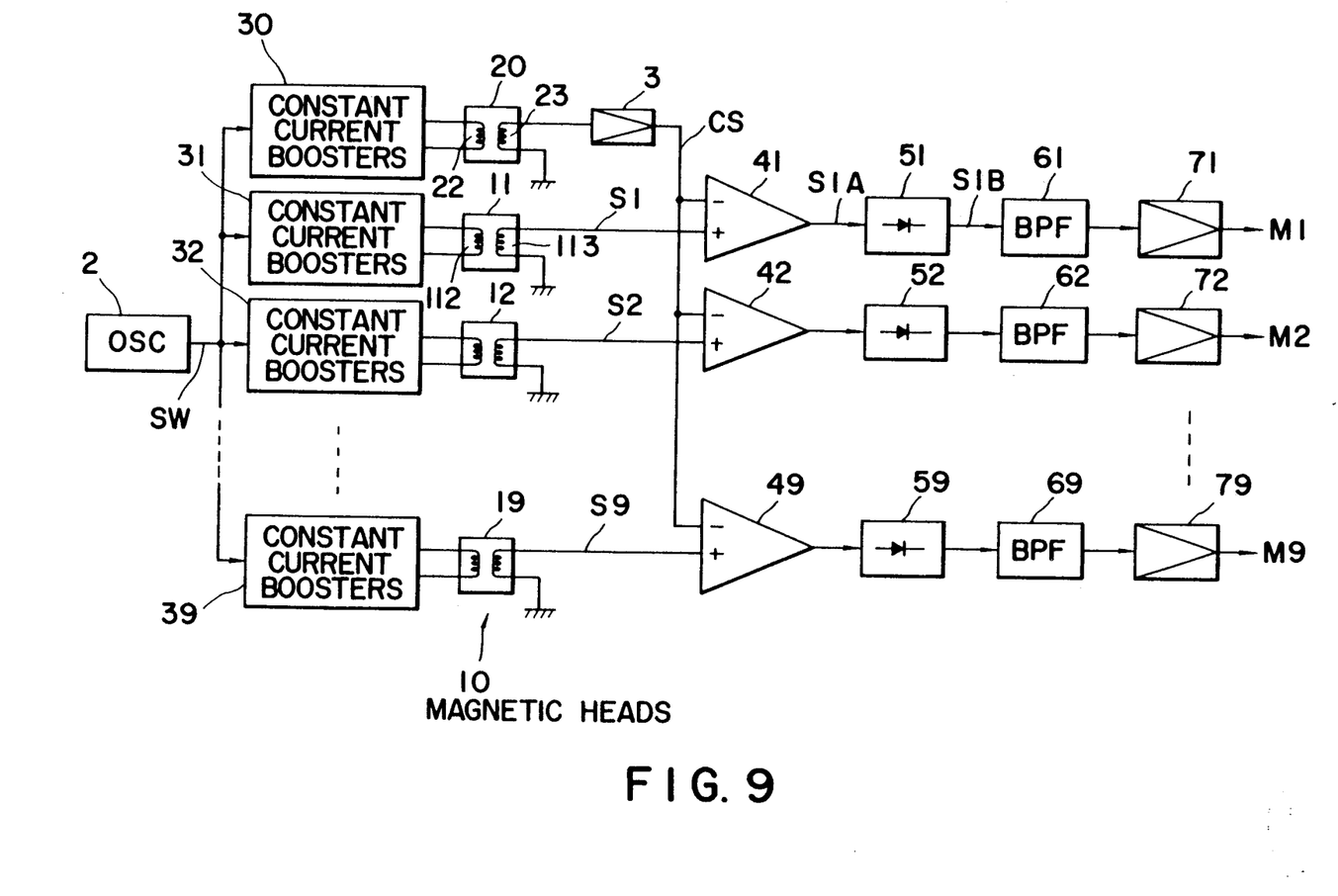
FIG. 9 is a block diagram used to show the whole structure of a magnetic pattern detection system.

The multichannel type magnetic head 10 is driven by a circuit shown in FIG. 9, and magnetic signals M1 through M9 are obtained in multichannel in correspondence to the magnetic member of an object of the detection placed above the detection head plane. More particularly, sine wave SW of a predetermined frequency outputted from a sine wave oscillator 2 is inputted to constant current boosters 30 through 39, and the constant current booster 30 excites the respective primary coils of the magnetic heads 11 through 19 and the cancellation head 20. The output from the secondary coil 23 of the cancellation head 20 is inputted to differential amplifiers 41 through 49 via a buffer amplifier 3, and detection signals S1 through S9 of the secondary coils of the magnetic heads 11 through 19 are inputted to the differential amplifiers 41 through 49 respectively. The difference signals between the detection signals S1 through S9 and the cancellation signal CS obtained by the differential amplifiers 41 through 49 are respectively inputted to full-wave rectifying circuits 51 through 59. The full-wave rectified signals are inputted to band-pass filters 61 through 69 respectively and amplifiers 71 through 79 to output magnetic signals M1 through M9.

The operation in the circuit of the above structure will be described referring to the waveforms shown in FIGS. 10A through 10F. Since the operation at the magnetic heads 11 through 19 are identical to each other, the description will be given only to the magnetic head 11.

Figure 10A:
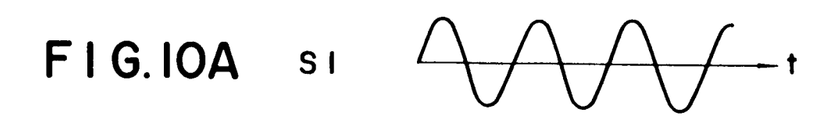
FIGS. 10A through 10F are a waveform graphs used to show examples of operation thereof.
Figure 10B:
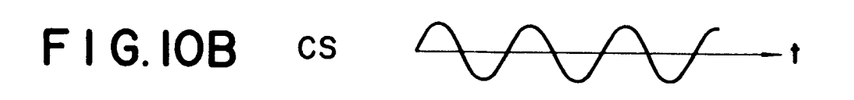
Figures 10C, 10D:
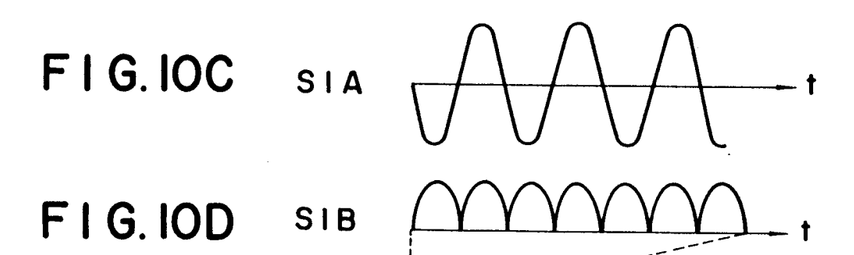
Figure 10E:
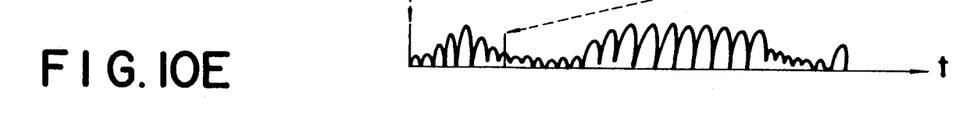
Figure 10F:
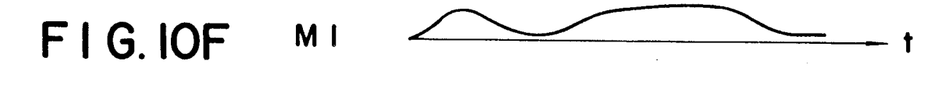

The primary coil 112 of the magnetic head 11 is fed with a constant current of a predetermined frequency from the constant current booster 31. In correspondence to the magnetic member of the object such as a note placed to oppose the detection head plane of the multichannel type magnetic head 10, the detection signal S1 shown in FIG. 10A is outputted from the secondary coil 113 of the magnetic head 11 and inputted to the differential amplifier 41. In correspondence to the noise component but irrespective of the magnetic member of the object, signals are outputted from the secondary coil 23 of the cancellation head 20 and are inputted to the differential amplifier 41 as the cancellation signal CS shown in FIG. 10B via the buffer amplifier 3. The difference signal S1A obtained by differential amplifier 41 shown in FIG. 10C is rectified in full-wave by the full-wave rectifying circuit 51 as shown in FIGS. 10D and 10E. From this full-wave rectified signal, the envelope is extracted by the band-pass filter 61 to output the magnetic signal M1 from the amplifier 71 which corresponds to the magnetic member as shown in FIG. 10F.

The example described in the foregoing statement concerns a case where the magnetic member changes against the time t or, more specifically, a case where an object of detection moves relative to the multichannel type magnetic head 10. However, this invention detector can obtain magnetic characteristics of an object as magnetic signals even when the object is standing still. Since one cancellation head 20 is provided against all the magnetic heads 11 through 19 to remove the noise components arising out of variations in the sine wave oscillator 2 or the temperature characteristics from the detection signal component, the magnetic signals can be obtained with a high detection precision.

Accordingly, as plural AC excitation type magnetic cores are arranged in a row, and a cancellation core is provided for noise removal, this invention multichannel magnetic head can detect the magnetic characteristics as a whole even when the object of detection stays still without depending on the relative speed of the magnetic member and the magnetic head. The effect of the noise therefore remains minimal. By sharing one cancellation coil for noise removal by plural magnetic heads, the whole structure becomes extremely simple to thereby achieve a remarkable reduction in cost compared to the prior art AC excitation magnetic heads which are placed in a plural member.

Figure 11:
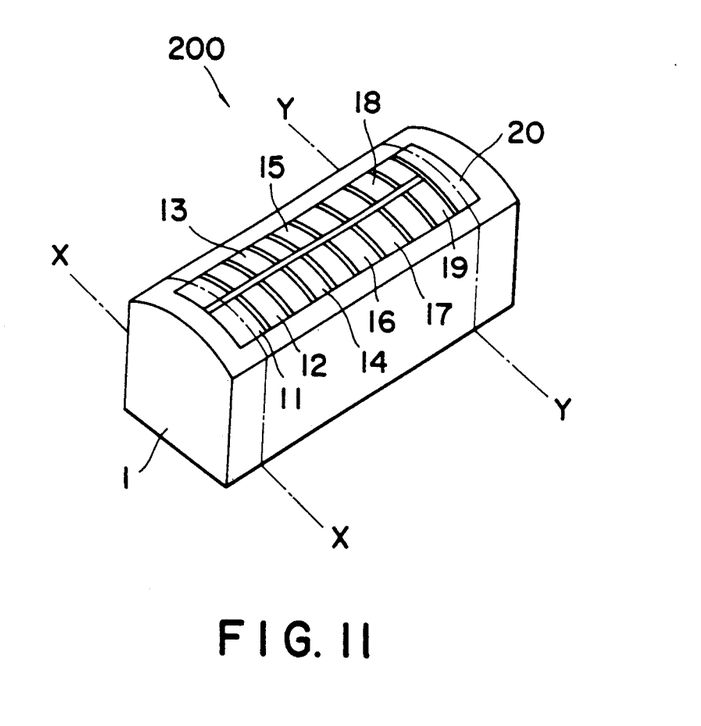
FIG. 11 is a perspective view used to show another embodiment according to this invention.
Figure 12A:
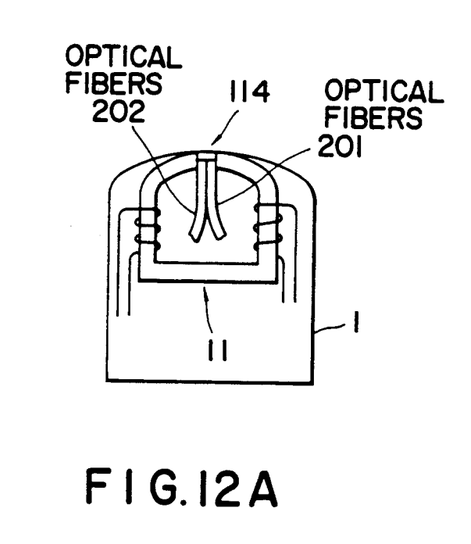
FIG. 12A is a cross-sectional view of the embodiment shown in FIG. 11 at the line X—X.
Figure 12B:
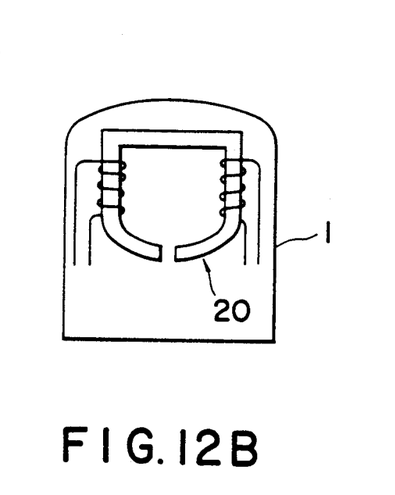
FIG. 12B is a cross-sectional view at the line Y—Y.

If a sensor comprising optical fibers is provided between gaps in the multichannel type magnetic heads, it becomes possible to detect the magnetic patterns and the optical patterns at the same position and time. As shown in FIG. 11, a multichannel type head (a magnetic and optical sensor) 200 is similar to the multichannel type magnetic head 10 of FIG. 6 in appearance and structure. FIGS. 12A and 12B show cross-sectional structures along the line X—X and the line Y—Y respectively. The structure of the magnetic cores 11 along the line X—X in FIG. 11 is shown in FIG. 12A in plane and in FIG. 12B in cross section.

Figure 14:
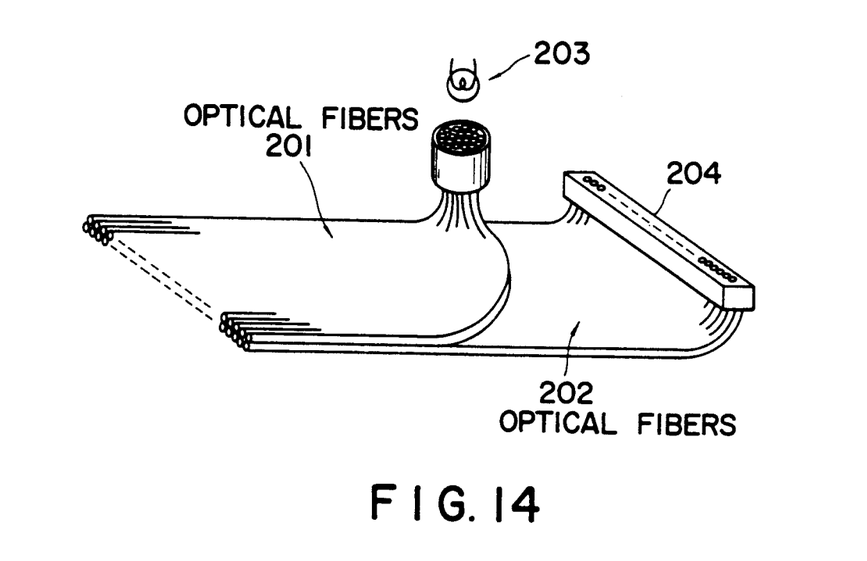
FIGS. 14 through 16 are views used to explain examples of the arrangement of optical fibers used in this invention.
Figure 15:
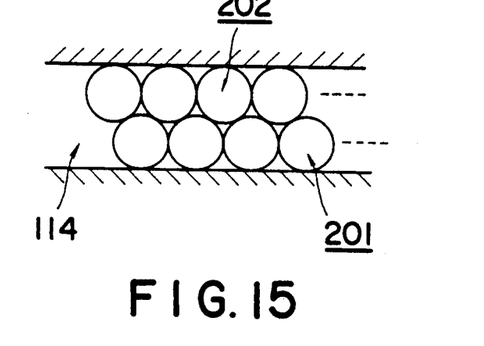
Figure 16:
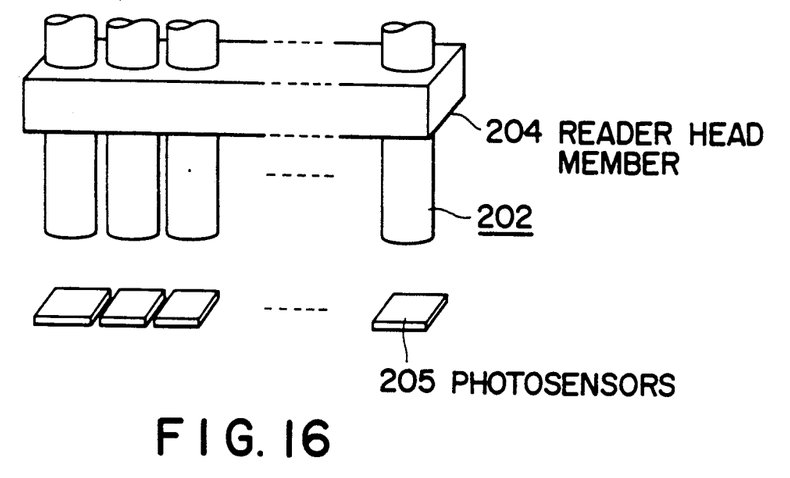

A plural member of optical fibers 201 for projecting light an a plural number of optical fibers 202 for receiving light are arranged in a gap 114 of the magnetic head 11 so that the light is projected on an object of the detection 110 from ends of the optical fibers 201 and the light reflected from the object is received and inputted to the ends of the optical fibers 202. The optical fibers 201 and 202 are similarly arranged in gaps of magnetic cores 12 through 19 arranged in a row, and ends of the light projecting optical fibers 201 are bundled as shown in FIG. 14 to receive light from a light source 203 (for instance, a near infra-red light emitting diode or a lamp). The optical fibers 201 and 202 may be plastic fibers. Out of the optical fibers 201 and 202 arranged for light projection and for light receiving as shown in FIG. 15 in the gap 114, the optical fibers 202 are fixed in layers of rows with a reader head member 204 as shown in FIG. 14. As shown in FIG. 16, the optical fibers 202 are further opposed to photosensors (for instance, photodiodes) 205 in a one-to-one relationship so that the received light can be detected by each of the photosensors 205 in the unit of a fiber.

Hard glass spacers (for example, of hard transparent glass, sapphire glass, optical glass BK7) are buried between the ends of the optical fibers 201 and 202 in the gap 114. The height of the spacers is determined in a manner to allow sufficient detection of optical patterns. The cancellation head 20 does not have optical fibers.

As described in the above statement, nine magnetic heads 11 through 19 and one cancellation head 20 are arranged in a row, and the optical fibers 201 and 202 are place din the gaps 114 of the magnetic heads 11 through 19 within the case 1 integrally.

Figure 13A:
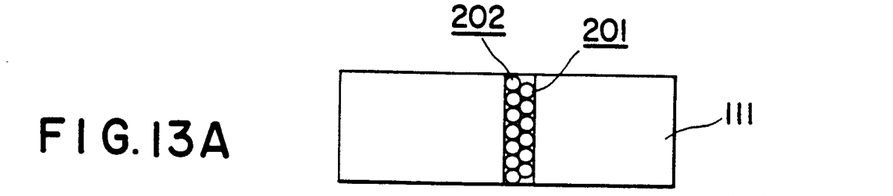
Figure 13B:
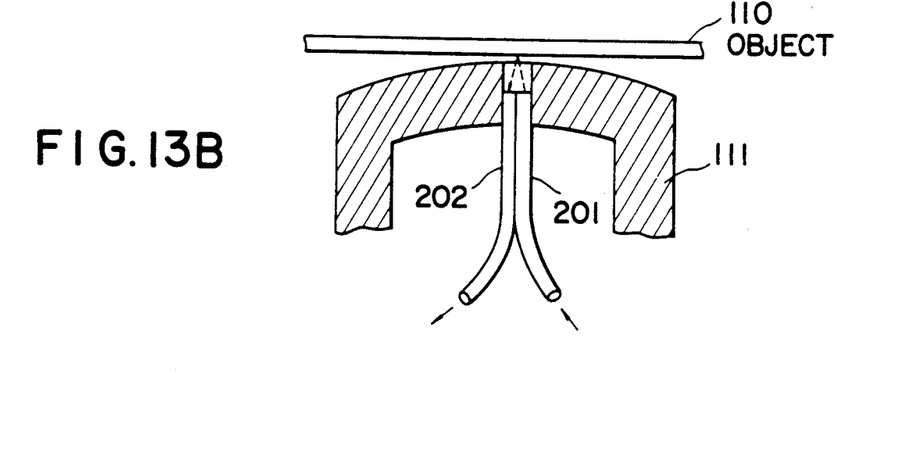
FIG. 13B is a cross-sectional view thereof.
Figure 17:
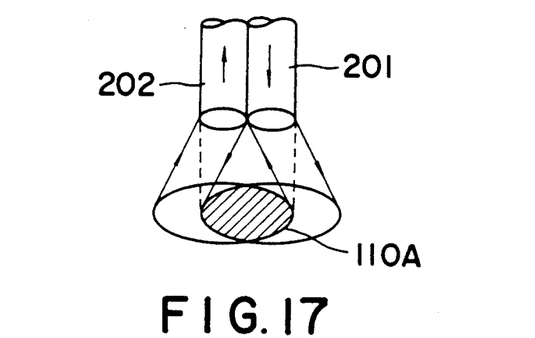
FIG. 17 is a view used to explain the detection of optical patterns according to this invention.

The optical pattern is detected conveniently in parallel to the process of detecting the magnetic pattern. More particularly, the light from the light source 203 is transmitted to the gaps 114 by the optical fibers 201, and projected onto the object 110 of detection which is opposed to the detection head plane as shown in FIG. 13. The projected light is reflected from the surface of the object 110 and inputted to the ends of the optical fibers 202 for light receiving to thereby optically read the location marked with diagonal lines 110A in FIG. 17 on the object 110. The light reflected and received from the surface of the object 110 is transmitted via the optical fibers 202, supplied to the photosensors 205 provided on other ends, and converted into electric signals corresponding to the optical pattern.

As stated in the above, the magnetic head is structured integrally with the optical fibers according to the multichannel type head of this invention, it can read the magnetic patterns and the optical patterns on the same location simultaneously in parallel operation.

Figure 18:
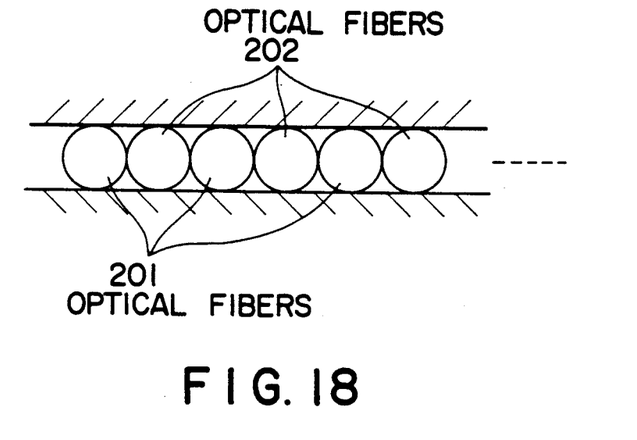
FIGS. 18 and 19 are views used to show other examples of the arrangement of optical fibers used in this invention.
Figure 19:
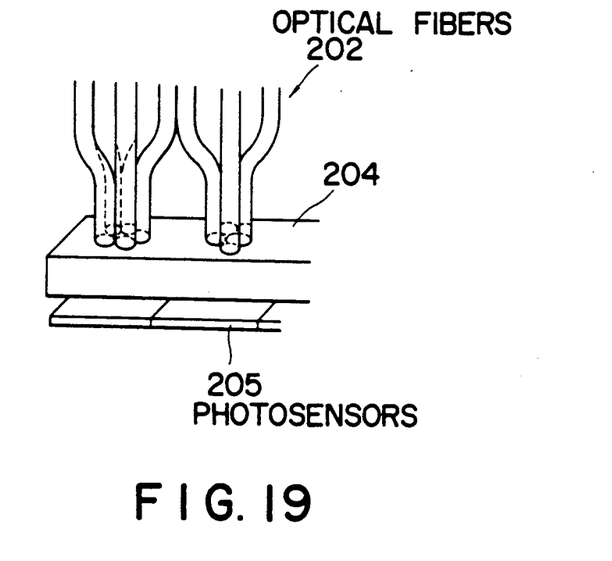

Although the number of magnetic heads arranged in a row of the multichannel type head is nine in the above embodiments, the number of magnetic heads may be determined arbitrarily. Although one cancellation head is provided on an end of detection head plane in the above embodiments, the number of cancellation heads and the position for installing them may be determined arbitrarily so far as cancellation signals are not affected by the magnetic member of the object. Moreover, although primary coils of the magnetic heads and of the cancellation head are excited by sine waves, it does not necessarily have to be sine waves. It m ay be rectangular wave. Although fibers for light projection and optical fibers for receiving light are arranged in two rows in a gap in the above embodiment, they may be arranged in one row alternately as shown in FIG. 18. Alternatively, the optical fibers for receiving light may be bundled as shown in FIG. 19.

It should be understood that many modifications and adaptation of the invention will become apparent to those skilled in the art and it is intended to encompass such obvious modifications and changes in the scope of the claims appended hereto.

What is claimed is:

1. A multichannel type magnetic head comprising plural magnetic cores arranged in a row which are wound with primary coils and secondary coils respectively, at least one cancellation core which is wound with a primary coil for cancellation and with a secondary coil for cancellation, and a member which integrally connects said plural magnetic cores and said at least one cancellation core, wherein detection portions of said plural magnetic cores are arranged opposed in a row with respect to an object of detection and wherein said at least one cancellation core is disposed differently from said plural magnetic cores so as to be unresponsive to said object of detection.

2. A multichannel type magnetic head as claimed in claim 1, wherein only one of said at least one cancellation core is provided either at an end or at a position midway of said plural magnetic cores.

3. A multichannel type magnetic head as claimed in claim 1, wherein a plurality of said at least one cancellation core are provided at ends of said plural magnetic cores.

4. A multichannel type magnetic head as claimed in claim 1, wherein said at least one cancellation core and said plural magnetic cores are identical in shape and material.

5. A multichannel type magnetic head as claimed in claim 1, wherein the primary coils of said plural magnetic cores and said at least one cancellation core are excited with sine wave signals.

6. A multichannel type head comprising an arrangement of plural magnetic cores which are wound with primary coils and with secondary coils respectively, and which are provided with gaps at an interval on detection planes thereof, at least one cancellation core which is wound with a primary coil for cancellation and with a secondary coil for cancellation, a member which integrally connects said plural magnetic cores and said at least one cancellation core, and optical fibers arranged in each gap wherein detection portions of said plural magnetic cores and an end of said optical fibers are opposed in a row with respect to an object of detection and wherein said at least one cancellation core is disposed differently from said plural magnetic cores so as to be unresponsive to said object of detection.

7. A multichannel type head as claimed in claim 6, wherein said optical fibers are divided into those for projecting light and those for receiving light, optical fibers of each type are arranged in a row, and the arrangements of said optical fibers are placed in layers.

8. A multichannel type head as claimed in claim 7, wherein an end of the optical fibers for light projection is led to a light source while an end of the optical fibers for said receiving light is fixed with a reader member.

9. A multichannel type head as claimed in claim 8, wherein photosensors are provided on the side of an end of said optical fibers for receiving light.

10. A multichannel type head as claimed in claim 6, wherein said optical fibers are classified into those for projecting light and those for receiving light, and each type of optical fibers is arranged alternately in one row.

11. A multichannel type head as claimed in claim 6, wherein spacers are provided between said optical fiber ends and said detection portions arranged in said gaps.

12. A multichannel type head as claimed in claim 11, wherein the height of said spacers is determined in a manner to allow sufficient detection of optical patterns.

13. A multichannel type head as claimed in claim 11, wherein hard glass members are buried in said gaps.

* * * * *